United States Patent [19]

Syeda-Mahmood

[11] Patent Number: 5,978,620
[45] Date of Patent: Nov. 2, 1999

[54] RECOGNIZING JOB SEPARATOR PAGES IN A DOCUMENT SCANNING DEVICE

[75] Inventor: Tanveer F. Syeda-Mahmood, Rochester, N.Y.

[73] Assignee: Xerox Corporation, Stamford, Conn.

[21] Appl. No.: 09/004,637

[22] Filed: Jan. 8, 1998

[51] Int. Cl.[6] .................................................. G03G 15/00
[52] U.S. Cl. .......................................................... 399/84
[58] Field of Search ................................. 399/9, 75, 82, 399/83, 84

[56] References Cited

U.S. PATENT DOCUMENTS

| | | | |
|---|---|---|---|
| 4,352,012 | 9/1982 | Verderber et al. | 235/487 |
| 4,609,283 | 9/1986 | Murata et al. | 399/84 |
| 4,629,311 | 12/1986 | Kaneko et al. | 399/84 |
| 4,757,348 | 7/1988 | Rourke et al. | 399/84 X |
| 4,970,554 | 11/1990 | Rourke . | |
| 4,987,447 | 1/1991 | Ojha | 399/84 |
| 5,051,997 | 9/1991 | Sakashita et al. | 371/22.4 |
| 5,161,037 | 11/1992 | Saito | 358/468 |
| 5,235,396 | 8/1993 | Ito et al. | 399/84 |
| 5,243,381 | 9/1993 | Hube . | |
| 5,247,371 | 9/1993 | Hikawa et al. | 358/448 |
| 5,563,986 | 10/1996 | Suzuki | 395/114 |
| 5,579,087 | 11/1996 | Salgado . | |
| 5,590,245 | 12/1996 | Leamy et al. | 395/118 |
| 5,608,493 | 3/1997 | Tanaka et al. | 399/83 |
| 5,619,649 | 4/1997 | Kovnat et al. | 395/200.01 |
| 5,666,214 | 9/1997 | MacKinlay et al. | 399/84 X |

*Primary Examiner*—Sandra Brase
*Attorney, Agent, or Firm*—Luis Ortiz

[57] ABSTRACT

A method for recognizing job separator pages that tolerates more changes in imaging conditions involving pixel resolution, noise, pose changes (rotation, translation and shear) and a system which can be trained on-site to learn any new separator page. The invention is suitable for use in any scanning assembly systems such as flatbed scanners, feed through document handlers, single page feed scanners, as well wraparound document handlers, and is insensitive to leading and trailing edge-base skew detection problems. A job sheet is visually recognized. Detection of alignment markers is invariant to skew of the most general form and includes all rotations and stretches that occur on a page due to page folding.

11 Claims, 5 Drawing Sheets

RECOGNIZING JOB SEPARATOR PAGES IN A DOCUMENT SCANNING DEVICE

FIELD OF THE INVENTION

This invention is generally related to the recognition of job separator pages and, more particularly, to a system and method for recognizing job separator pages that precede actual jobs in a scanning job such as in document handlers of a copier or scanner.

BACKGROUND OF THE INVENTION

With the advent of high speed digital copiers, scanners and automatic document processing-based document center systems, one of the challenging problems is fully exploiting their capacity. If we analyze the work flow process in using these systems, we observe that a single job is being processed even though the document handler's capacity may exceed the current job size. In such a scenario, users have to wait or return to find a time when the system is free for use. If we could allow multiple jobs to be stacked and processed, this would make such a system more convenient to use and also utilize its capacity to full. To enable this however, would require a mechanism to recognize the presence of a new job and invoke it with the respective job-specific parameters.

What follows are some prior methods directed at job separation and identification schemes where attempts have been made to recognize jobs at the scanner, processing, and printer aspects of document processing.

U.S. Pat. No. 4,352,012, entitled "Header sheet for image communications system," issued to Verderber et al discloses a header sheet for use with an automatic image communication transmission system, having regularly spaced hash marks around the border to identify the sheet as a header. Additional markings are in the border to identify the leading edge of the sheet relative to the scan raster of the system, and areas to designate sender and addressee stations by the location of markings relative to the position of the scan raster.

U.S. Pat. No. 4,970,554, entitled "Job processing system for high speed electronic copying/printing machines," issued to Rourke discloses a job processing site having plural electronic printers and document scanners, a job input station with electronic job ticket for entering printing instructions for a job with a job number to a job program file, a copier to provide a hard copy of the electronic job ticket with job number in machine readable form for assembly with the documents that comprise the job so that when the job is processed at the job site, the job number is obtained to retrieve the printing instructions for the job from the job program file.

U.S. Pat. No. 5,051,779, entitled "Job control sheet for image processing system," issued to Hikawa discloses an image processing system that specifies input image information on the basis of existence of a special mark or patterns printed on a job control sheet. Selected one of various image processing is executed in accordance with the existence of the special marks or patterns to thereby obtain output image information. Each of the special marks or patterns are line drawings, each drawn so as to have a certain low correlative angle to longitudinal and transverse directions of an image provided with the special mark or patterns.

U.S. Pat. No. 5,161,037, entitled "Image processing system and method for processing documents in accordance with a job control sheet," issued to Saito discloses an image processing system in which input image information that is read from a document original is subjected to image processing on the basis of machine operating instruction information that is defined by a job control sheet, to obtain output image information. Machine operating instruction information borne by the job control sheet is read and interpreted, and it is judged whether or not the interpreted instruction is executable. When the machine operating instruction is executable, image processing of a batch of document originals following the job control sheet is executed to generate output image information, whereas, if the machine operating instruction is unexecutable, the batch of document original is fed forward without being processed up to the last document original that immediately precedes a subsequent job control sheet.

U.S. Pat. No. 5,247,371, entitled "Image processing system using job control sheets with attributes," issued to Hikawa et. al discloses an image processing system in which an input image read from a document is subjected to image processing on the basis of machine operations indicating information defined in a job control sheet, to thereby obtain an output image. The job control sheet having specific marks or patterns arranged at its four corners so as to be point symmetrical with each other for discriminating the job control sheet from a document. The specific marks are comprised of attributes which are different in part for each of the specific marks.

U.S. Pat. No. 5,243,381, entitled "Method for compiling multiple jobs with job reference sheets," issued to Hube discloses a method provided for printing a job, represented by a set of electronic pages, with a job reference sheet in a printing system, the printing system having a printer and a scanner adapted to both convert the job into the set of electronic pages and decode machine readable code. The method includes the steps of storing the set of electronic pages in a memory section and assigning a unique job identifier to the stored job for indicating a location of the stored job in the memory section. The method further includes the steps of printing the job reference sheet so that the unique job identifier is designated on the job reference sheet in machine readable code and scanning the job reference sheet for reading the machine readable code to retrieve the set of electronic pages from the memory section for printing with the printer.

U.S. Pat. No. 5,563,986, entitled "Image processing system," issued to Suzuki discloses an image processing system for processing input image data according to the machine operation instructions described in a job control sheet and outputting the processed image data. An instruction recognizing unit recognizes the machine operation instructions stored in the job control sheet; a decision unit decides whether execution of the recognized machine operation instructions is possible or impossible; a processing unit processes the input image data processed by the job control sheet when execution of the machine operation instruction is possible, and outputs the processed image data; an instruction altering unit alters the machine operation instructions by an operator of the machine; a storing unit stores input image data; and a control unit controls all of the units.

U.S. Pat. No. 5,579,087, entitled "Constructing a multi-segment print job from multiple local or remote sources using a network interface," issued to Salgado discloses a technique of constructing a multi-segment print job from multiple local and remote sources on a network using a network interface to identify print job segments and location of segments on the network by entering a start build print job function at the network interface, identifying each segment of the print job including segment location, specifying print job characteristics such as quantity and quality for each segment, entering an end build print job function at the network interface, and identifying a printing device on the network whereby each segment of the print job is accessed and distributed to the printing device to complete the multi-segment print job.

U.S. Pat. No. 5,590,245, entitled "Method for transmitting image processing jobs from a client system, and routing and performing the jobs in an image processing system," issued to Leamy discloses an image processing method carried out by a system where a client system automatically logs client data and retrieves image data to produce a job file which is automatically transmitted to a modem of an image processing system. A control image processor automatically monitors the job file and carries out routing operations and also supervisor notification operations to ensure efficient and effective implementation of the image processing method as required by the client. Each of the workstations are capable of automatic configuration for particular job types by setting image processing parameter values such as memory and virtual memory settings.

U.S. Pat. No. 5,608,493, entitled "Image forming apparatus capable of setting an operational mode by reading image of a predetermined format," issued to Tanaka discloses an image forming apparatus which outputs an operation setting paper sheet (Op-sheet) having printed thereon an operation setting image (template) stored in a data ROM upon operating an operation setting paper sheet output key (OPS key). The image forming apparatus reads the operation setting image on the operation setting paper sheet by a scanner, and sets an operational mode according to selection items in the read image, thereby performing an image forming operation according to the operational mode. By producing a print output of the operation setting image, the operation setting paper sheet in the original form without having a deterioration of the image quality or displacement can be provided with the unique image quality of this image forming apparatus which enables the image to be surely read by the image forming apparatus. Therefore, compared with the case of adopting the conventional operational setting paper sheet to be prepared by repetitively copying the original sheet, an occurrence of reading errors can be suppressed, thereby surely preventing an operation error.

U.S. Pat. No. 5,619,649, entitled "Network printing system for programming a print job by selecting a job ticket identifier associated with remotely stored predefined document processing control instructions," issued to Kovnat discloses an approach suited for use with an arrangement including an image processing apparatus and a server, with the server being disposed remotely of the image processing apparatus. In practice, a user accesses the remotely disposed server from the image processing apparatus by entering an appropriate personal identification number and selecting a job ticket from a directory listing the job tickets resident at the server. One of the job tickets is then selected and transmitted across the network from the server to the image processing apparatus. A job is then programmed at the image processing apparatus with the selected job ticket.

It is clear that the majority of the art is focused on the output processing function related to job separation. The notion of fast detection and recognition of arbitrary separator sheets under general affine deformations has not been proposed and/or implemented and demonstrated. It is therefore an feature of this invention to provide a method that tolerates more changes in imaging conditions involving pixel resolution, noise, pose changes (rotation, translation and shear) and a system which can be trained on-site to learn any new separator page. It is suitable for use in any scanning assembly systems such as flatbed scanners, feed through document handlers, single page feed scanners, as well wraparound document handlers, and is insensitive to leading and trailing edge-base skew detection problems (unlike existing methods).

Other differences between the presented method and prior job sheet detection methods is the lacking notion of visual recognition of the job sheet, and avoidance of glyphs for purposes of alignment and location coding of job control information. Glyphs could still be used with other attributes of a job that are not location specific. In addition, herein proposed is a more extended use of the alignment marker to recover the affine pose parameters. The detection of alignment marker had been done earlier, only in restricted poses (vertical, horizontal, inverted vertical, inverted horizontal). The current alignment is invariant to skew of the most general form and includes all rotations and stretches that occur on a page due to page folding.

All of the references cited herein are incorporated by reference for their teachings.

SUMMARY OF THE INVENTION

A system for recognizing a job separator page on a scanning device in a scanner, or copier with document handler is provided. A separator page is defined to be any arbitrary page superimposed by an alignment marker. The recognition of separator page is based on a 2D model of a separator page and is done by a three step process involving (1) the detection of the alignment marker, (2) computation of alignment (pose) parameters, and (3) verification of the model image by projecting onto a given scanned image using the computed pose parameters.

This recognition method is independent of the content of the separator page and can work on a fixed page generated by the machine itself (copier, scanner, document center) or a user-specified page at the place of use of the machine (as in an office environment where users can design their own logo-based separator pages). To handle the latter case, a training module is included in the system so that an arbitrary page can be turned into separator page by a digital placement of alignment markers on the scanned image, and reproducing it for future use.

The method recognizes job separator pages that precede actual jobs in a scanning job such as in a document handler of a copier or scanner. The separator page can be either a pre-specified one generated by the machine itself or it could be user designed.

The method involves generating a model of a separator page and using it to recognize subsequent instances of the separator page among a set of documents being scanned, by taking into account the differences in scanning resolution, skew (rotation and shear), page translation and noise. The method requires a model generation step that acquires the 2d model information relevant to a separator page. The method has the following steps:

a) Alignment marker detection;

b) computation of pose parameters; and c) verification of projected model onto a given page.

The method described here tolerates more changes in imaging conditions than is possible in comparable methods and can be used in a variety of scanning assembly systems such as flatbed scanners, feed through document handler, single page feed scanners, as well wraparound document handlers. Specifically, it is robust to the following:

1. Document orientation (portrait, landscape).

2. No image processing is done to discover the page orientation unlike existing methods.

3. Skew including rotation and shear (as for misfed pages).

4. Difference between horizontal and vertical resolution scans.

5. Pixel resolution (ranging from 100 dpi to 600 dpi and beyond).

6. Copier settings such as choice of scale, contrast threshold, and carryover from previous jobs.

7. Noise in the image.

In addition, the recognition method is computationally attractive as it requires only reduced resolution versions of images. It has been implemented and tested to demonstrate fast detection of separator job sheets at the rate of 60 pages per minute.

In summary, the new contributions made by this invention are: the generation of separator pages by training on a single sample page; detection of separator pages under a wide variety of imaging conditions, including rotation, shear, and noise; fast and reliable detection of alignment marker under pose changes; and recovery of pose changes.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

For purposes of describing the foregoing a "model" is a scanned image of a separator page suitably superimposed with an alignment marker. The model can be either fixed in a machine before shipping for machine-designed separator pages (say printed by a document center system to be re-used at the time of scanning), or could be learned during a training mode after deployment at the customer site, where a user designates a particular document of his/her choice to be a separator page for subsequent jobs. The latter is useful in an office environment where users can design their own logo-based separator pages. In either case, the input to the model generation stage is a scanned bitmap of the separator page. For purposes of reliable detection, the bitmap is assumed to be scanned at a high resolution (400 dpi) during the training stage. The model generation stage then puts a digital alignment marker on the original document.

Figure 1:
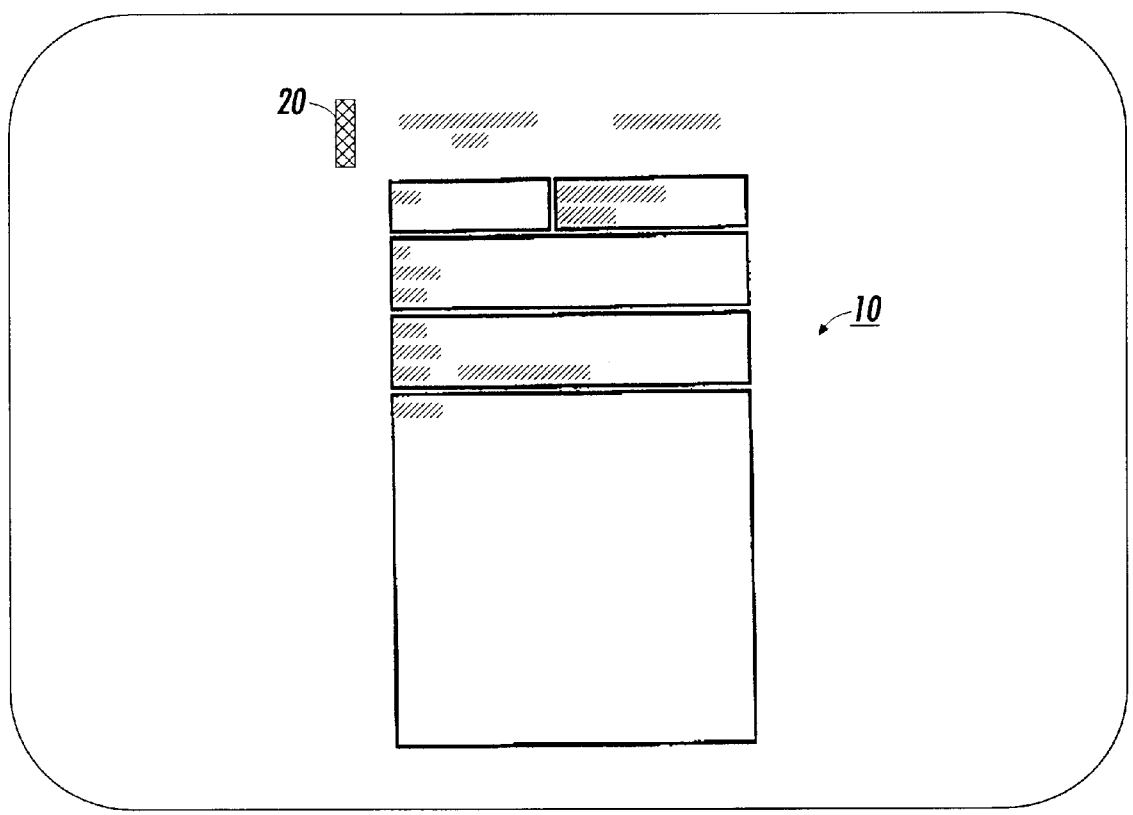
FIG. 1 illustrates a typical example of a job separator page for a facsimile transmission having an alignment marker.

Referring to FIG. 1, an example of a job separator page 10 is provided. Although any alignment marker that leads to computation of alignment parameters is admissible in the current method, the example alignment marker 20 is a dark rectangular region. Such a region is salient, can be easily detected, and is less likely to be confused with other content in the document. Moreover, the use of rectangular region leads to a reliable computation of pose parameters, providing at least 4 features. The alignment marker is placed at the first available place on the bitmap that can accommodate such a marker. Usually, such a place can be found at the top left corner of the page. A dark rectangular region of size 42×10 (in the normalized image of size 512×352) was chosen in experiments. The model page 10 is stored in its reduced resolution form (chosen was 512×512) for fast matching during job sheet recognition. In addition, the four extremes of the alignment marker in the normalized image are noted as part of the model description of the separator page (denoted by ($P_1$, $P_2$, $P_3$, $P_4$) in the following formulas). The full resolution image is, however, used for reproduction (by printing) for subsequent jobs as a separator page.

Given a scanned document, it is first normalized to the same size as the model (512×512). This allows all documents scanned at different pixel resolution to be handled in a uniform manner. Recognition involves finding a region that resembles the alignment marker, recovering pose parameters by a match to the alignment marker on the model and projecting the model onto the page for final verification. Failure at each step indicates the page to not be a separator page, indicating that normal processing should resume. Success at recognition may indicate further specialized processing according to job-specific parameters either specified on the separator page itself or on an electronic job template associated with the job being scanned.

It is well known that the effect of skew (rotation as well as shear) on a rectangular region is to change its appearance to a parallelogram. The detection of alignment marker, therefore, involves the detection of the parallelogram corresponding to the marker using the following operations. Connected components of dark pixels are formed. Regions with a pixel count that is within a scale change bound are retained. An increase or decrease of size by a factor of 10 is chosen as the threshold. This accounts for copying jobs requiring scaling.

Of the regions retained in Step-2, those that are not "full" below a certain threshold (90% was chosen) are discarded. Fullness of a region R is given by:

$$Fullness(R)=Polygon\text{-}Area(R)-Pixel\text{-}count(R)$$

The polygon area is computed after finding the boundary pixels of the region. The pixel-count is simply the number of black pixels in the region. The above step retained all filled regions. To detect those that are parallelograms, the dominant orientation of the region is determined by finding the moment of inertia axes as:

$$L_1^T = \sqrt{\left(\sqrt{(A-C)^2 + B^2}\right) + (A-B)}, \quad +\sqrt{\left(\sqrt{(A-C)^2 + B^2}\right) - (A-C)}$$

$$L_2^T = \sqrt{\left(\sqrt{(A-C)^2 + B^2}\right) - (A-C)}, \quad -\sqrt{\left(\sqrt{(A-C)^2 + B^2}\right) + (A-C)}$$

where, $$A = \sum_{i=1}^{M}\sum_{j=1}^{N} \overline{i^2} b(i,j), \quad B = 2\sum_{i=1}^{M}\sum_{j=1}^{N} \overline{i} \cdot \overline{j} \cdot b(i,j), \quad C = \sum_{i=1}^{M}\sum_{j=1}^{N} \overline{j^2} b(i,j)$$

and b(i,j) is the value of the binary image at pixel (i,j). Here M×N is the size of the bounding box around the chosen region. (i,j) are the coordinates of (i,j) with respect to the region's centroid.

The coordinates of the point of intersection of these orthogonal axes give the bounding oriented rectangle around the region. Let it be denoted by ($R_1$, $R_2$, $R_3$, $R_4$). Using the bounding oriented rectangle coordinates, 4 external points on the region's contour that are closest to $R_1$, $R_2$, $R_3$, $R_4$, respectively, are derived. Such external points are convexities along the region's contour as obtained by a line-segment approximation. Let the resulting quadrilateral be denoted by ($S_1$, $S_2$, $S_3$, $S_4$). The region detected is a parallelogram if:

|Area of ($S_1$, $S_2$, $S_3$, $S_4$)-Pixel-count(R)| ≦ ε where ε is a suitably chosen threshold. The equivalence is detected within a small error threshold for deviations from a parallelogram under noise.

There are 4 possible correspondences between the 4 corners of the detected parallelogram and the 4 corners of the model alignment marker. For each such correspondence the pose parameters are obtained by solving a linear system of equations:

$$\begin{pmatrix} P_{1x} & P_{1y} & 0 & 0 & 1 & 0 \\ 0 & 0 & P_{1x} & P_{1y} & 0 & 1 \\ P_{2x} & P_{2y} & 0 & 0 & 1 & 0 \\ 0 & 0 & P_{2x} & P_{2y} & 0 & 1 \\ P_{3x} & P_{3y} & 0 & 0 & 1 & 0 \\ 0 & 0 & P_{3x} & P_{3y} & 0 & 1 \\ P_{4x} & P_{4y} & 0 & 0 & 1 & 0 \\ 0 & 0 & P_{4x} & P_{4y} & 0 & 1 \end{pmatrix} \begin{pmatrix} a \\ b \\ c \\ d \\ T_1 \\ T_2 \end{pmatrix} = \begin{pmatrix} P'_{1x} \\ P'_{1y} \\ P'_{2x} \\ P'_{2y} \\ P'_{3x} \\ P'_{3y} \\ P'_{4x} \\ P'_{4y} \end{pmatrix}$$

where ($P_1$, $P_2$, $P_3$, $P_4$) is a permutation of ($S_1$,$S_2$,$S_3$,$S_4$), and (a,b,c,d,T1,T2) are the affine pose parameters relating a point P'=(i',j') on the image and P=(i,j) on the model by:

$$\begin{pmatrix} i' \\ j' \end{pmatrix} = \begin{pmatrix} a & b \\ c & d \end{pmatrix} \begin{pmatrix} i \\ j \end{pmatrix} + \begin{pmatrix} T_1 \\ T_2 \end{pmatrix}$$

Pose verification involves projecting the model page onto the given image using the computed pose parameters. From the above equation, the location of the projected point (pixel) corresponding to the model point (ij) is given by (i',j'). The resulting image from such point projections is given by:

I(i',j')=M(i,j)

The verification step determines an "on" pixel on the model to be matched if it projects near an on-pixel in the image in a neighborhood (say 5×5 pixel neighborhood). The ratio of matched pixels to the total number of on-pixels constitutes a verification score D(M,I). The same process is repeated from image to model by projecting the image onto the model using the inverse affine parameters and the ratio D(I,M) is similarly computed. The projection is done both ways to achieve robustness against false positives, particular, when a document has a dark rectangular regions, and is fairly busy in terms of the number of pixels so that a pixel-match from model to image would be achieved but not image to model. The verification is said to succeed if:

min(D(M,I),D(I,M))≧d

Where d is some suitably chosen threshold.

Figure 2:
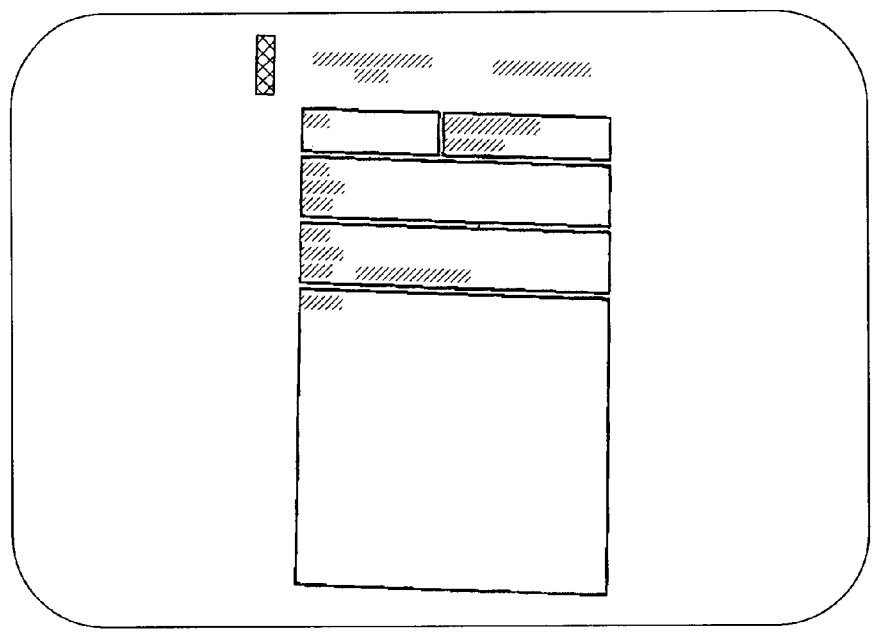
FIG. 2 illustrates the job separator page of FIG. 1 with a mild skew (clockwise rotation).
Figure 3:
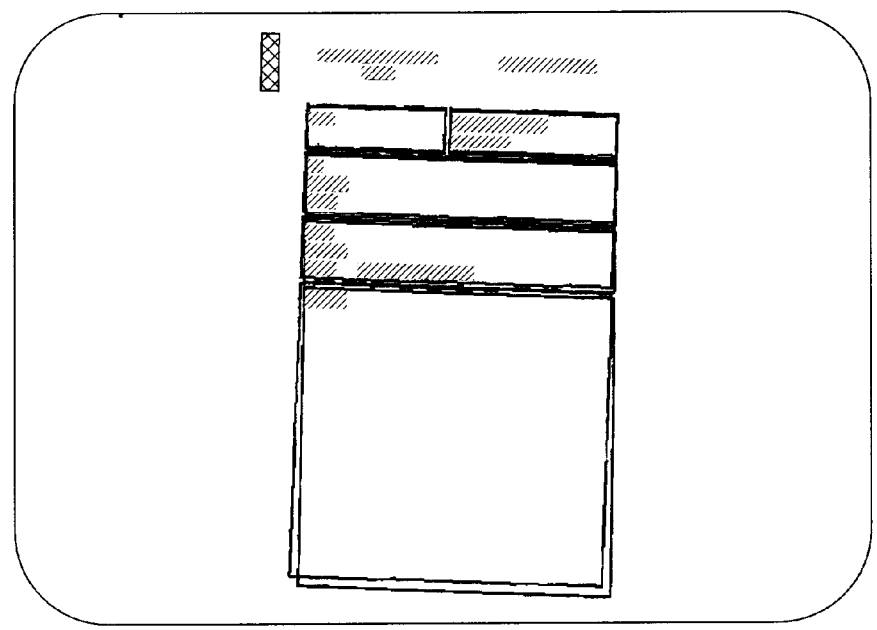
FIG. 3 illustrates the job separator page of FIG. 2 during separator page recognition shown by superimposing the model image of FIG. 1 onto the given page image of FIG. 2 using the computed pose parameters.

What follows are some examples of separator recognition under a variety of poses and in the midst of documents on a scanner. As mentioned before, FIG. 1 illustrates a separator page 10 with a marker 20. FIG. 2 shows a skewed version of the same page as may appear on a document handler (the skew being a slight clockwise rotation). Now referring to FIG. 3, the skewed page has been recognized as a separator page by projecting the model page of FIG. 1 onto the image page of FIG. 2.

Figure 4:
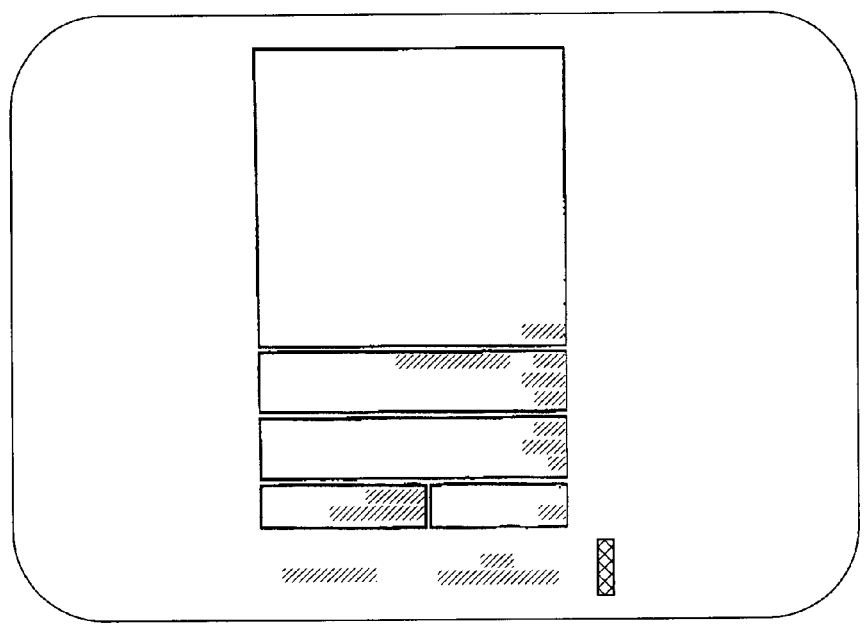
FIG. 4 illustrates the job separator page of FIG. 1 with large skew of about 180 degree rotation.
Figure 5:
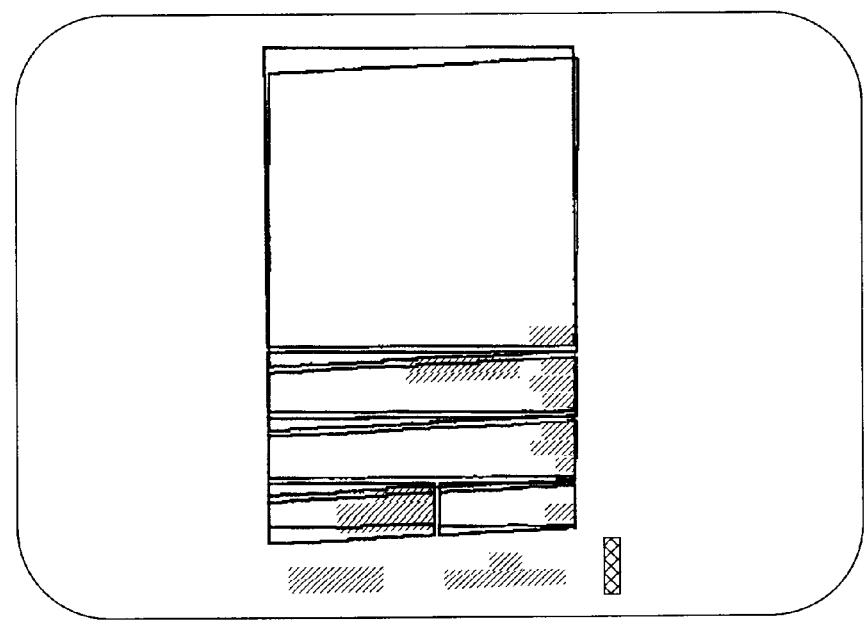
FIG. 5 illustrates the job separator page of FIG. 4 during separator page recognition shown by superimposing the model image of FIG. 1 onto the given page image of FIG. 4 using the computed pose parameters.

FIGS. 4 and 5 shows the recognition of the separator page in a inverted pose as can happen when the page is scanned in the wrong orientation FIG. 4 illustrates the job separator page of FIG. 1 with large skew of about 180+ degree rotation. Using the same process the model page (FIG. 1) is projected onto the image of FIG. 4 which is then recognized as a job separator page.

Figure 6:
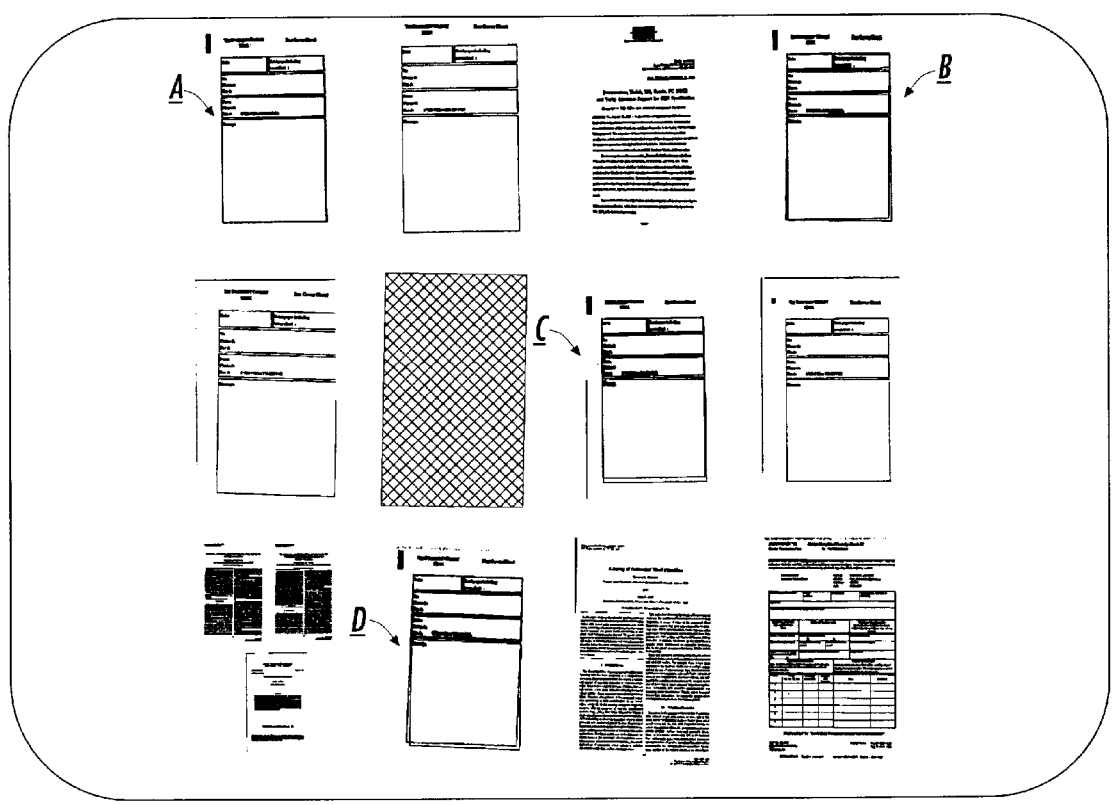
FIG. 6 illustrates twelve scanned pages that were processed with the invention, with four of the pages being properly recognized as job separator pages.

Finally, FIG. 6 shows the accuracy of separator page detection in the midst of other pages. A set of twelve pages are processed with four being detected as separator pages using the invention. These four recognized pages are marked as A, B, C, and D in FIG. 6, as further shown by projecting the model onto the respective pages. These images have been scanned at different resolution, ranging from 200 dpi to 400 dpi. Note that some of the images not recognized have the same content as the model page but lack the alignment marker, indicating the accuracy of recognition.

Figure 7:
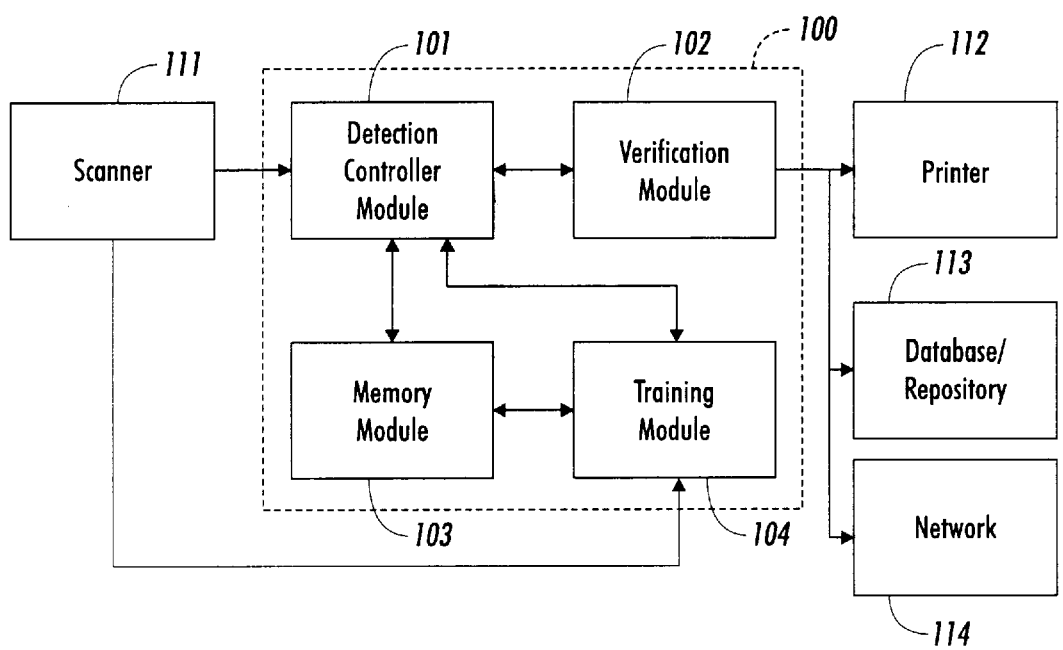
FIG. 7 illustrates a block diagram of a system capable of carrying out the method of the invention.

Referring to FIG. 7, a block diagram of the system design capable of carrying out the method of the invention is illustrated. A system 100 for recognizing a job separator page on a scanning device 14, would comprising a detection controller module 101 for receiving scanned input from the scanning device 111 and providing the controlled input to system components for verification 102 of a job separator page. With the illustrated system, the controller 101 accesses a memory module 103 which stores models used to compare against the scanned input. Once the model is projected onto he input, the verification module 102 verifies a match and the existence of a job page separator. This information can then be used by a printer 112 to process to job based on job parameters. Or the job documents may be stored subsequently in a database/repository 113. Alternatively, the documents can be distributed over the network 114 via email or other internet communications. The training option described above is provided by a training module 104 in cooperation with the memory module 103 and controller 101. Arbitrary images can be turned into a separator page models by digital placement of at least one alignment marker on said arbitrary image and storing said arbitrary image with said at least one alignment marker in said memory 103. The system as illustrated in FIG. 7 and describe above can all be implemented with a microprocessor programmed to control and operate as said means for receiving scanned input from a scanning device, means for detecting an alignment marker on a scanned image, means for computing pose parameters for said alignment marker by matching said alignment marker of said scanned image to a model, means for storing at least one model, and means for verifying said scanned image as a job separator page by projecting said model onto said scanned image using said pose parameters. The Detection controller, verification and training modules would be combined into microprocessor functions and the memory module would provide the models and program information to the microprocessor.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A system for recognizing a job separator page on a scanning device, comprising:
   a) means for receiving scanned input from a scanning device;
   b) means for detecting an alignment marker on a scanned image;
   c) means for computing pose parameters for said alignment marker by matching said alignment marker of said scanned image to a model;
   d) means for storing said model;
   e) means for verifying said scanned image as a job separator page by projecting said model onto said scanned image using said pose parameters; and
   b) means for controlling said receiving, detecting, computing, storing and verifying.

2. The system of claim 1 further comprising a training module for training said system with a plurality of models, whereby an arbitrary image can be turned into a separator page and model by digital placement of at least one alignment marker on said arbitrary image and storing said arbitrary image with said at least one alignment marker in said means for storing at least one module.

3. The system of claim 2 wherein a microprocessor is programmed to control and operate as said means for receiving scanned input from a scanning device, means for detecting an alignment marker on a scanned image, means for computing pose parameters for said alignment marker by matching said alignment marker of said scanned image with said model, means for storing said model, and means for verifying said scanned image as a job separator page by projecting said model onto said scanned image using said pose parameters.

4. The system of claim 3 wherein said microprocessor is further programmed to control and operate as said training module.

5. The system of claim 3 wherein said system uses said model to recognize instances of said separator page among the set of documents being scanned, by taking into account the differences in scanning resolution, skew, page translation and noise.

6. The system of claim 2 wherein said system uses said model to recognize instances of said separator page among the set of documents being scanned, by taking into account the differences in scanning resolution, skew, page translation and noise.

7. The system of claim 1 wherein said system uses said model to recognize instances of said separator page among the set of documents being scanned, by taking into account the differences in scanning resolution, skew, page translation and noise.

8. The system of claim 1 further comprising a means for generating said model, wherein said system uses said model to recognize instances of said separator page among the set of documents being scanned, by taking into account the differences in scanning resolution, skew, page translation and noise.

9. The system of claim 8 wherein 2-dimensional model information relevant to a separator page is utilized for generating said model.

10. A method for recognizing job separator pages within an image processing system, comprising:
    a) receiving scanned input from a scanning device;
    b) detecting an alignment marker on a scanned image received as part of said scanned input;
    c) computing pose parameters for said alignment marker by matching said alignment marker of said scanned image to a model; and
    d) verifying said scanned image as a job separator page by projecting said model onto said scanned image using said pose parameters and finding a match.

11. The method of claim 10 further comprising a training said system with a plurality of models, whereby an arbitrary image can be turned into a separator page and model by digital placement of at least one alignment marker on said arbitrary image and storing said arbitrary image with said at least one alignment marker for use during recognition.

* * * * *